United States Patent [19]

Figg

[11] 4,214,938

[45] Jul. 29, 1980

[54] SENSING AND LOCKING DEVICES

[75] Inventor: Anthony V. J. Figg, Spalding, England

[73] Assignee: Norprint Limited, England

[21] Appl. No.: 969,965

[22] Filed: Dec. 15, 1978

[30] Foreign Application Priority Data

Dec. 17, 1977 [GB] United Kingdom ............... 52599/77

[51] Int. Cl.$^2$ .............................................. B32B 31/00

[52] U.S. Cl. .................................... 156/361; 156/362; 221/73

[58] Field of Search ............................... 156/361-364, 156/540-542, 584; 221/73

[56] References Cited

U.S. PATENT DOCUMENTS 2,802,598 8/1957 Petterson .......................... 221/73 X

*Primary Examiner*—David A. Simmons

*Attorney, Agent, or Firm*—Leydig, Voit, Osann, Mayer & Holt, Ltd.

[57] ABSTRACT

A sensing and locking device for controlling the operation of a hand-held label applicator or other mechanism in response to a force generated by an article moved by the mechanism includes a pivotal sensing member disposed in the path of the article, which is disposed by contact with the article. Such displacement serves to activate a wedge-action locking device which then locks the article or one of a series of articles in a required position. The force required to displace the sensing member is very small.

10 Claims, 2 Drawing Figures

SENSING AND LOCKING DEVICES

BACKGROUND OF THE INVENTION

1. Field of the Invention

This invention relates to sensing and locking devices for use, for example, when an elongate moving member is required to be locked in a predetermined position when the elongate moving member has reached that predetermined position.

2. Summary of the Prior Art

In label applicators, for example, it is generally necessary that labels coated with a self-adhesive and carried on a silicone-treated backing strip shall be accurately positioned in a predetermined position within the applicator so that printing can be effected at a precise location on a given label. Detection of the positions of labels on the backing web could readily be effected by photosensitive means, but such means involve the use of electrical circuitry and hence the provision of a power source, which is not normally possible in a hand-held applicator. To overcome the difficulty it has been proposed to incorporate in the backing strip notches or other registration devices and by this means it has been possible to construct label applicators with feed devices which ensure correct registration of the labels at a printing station by engagement with the notches at predetermined points as the labels are indexed through the applicator. The cost of such webs is, however, higher than for plain webs with parallel sides and labels abutting one another on one surface of the web.

It is clearly desirable from the cost standpoint to employ label webs of simple form with rectangular or square labels and it is desirable that the position of the labels on the web should be detected by the very small forces generated by the labels themselves in order to arrest them at a predetermined position.

Accordingly an object of the invention is to provide a sensing and locking device which can detect and act on small forces such as those which can be applied by an edge of a label.

SUMMARY OF THE INVENTION

According to the present invention there is provided a sensing and locking device for controlling the operation of a mechanism in response to a force generated by an article movable by the mechanism, said device comprising a sensing member movable on contact by the article and locking means operable effectively to lock the mechanism directly or indirectly in response to movement of the sensing member by said force.

Further according to the present invention there is provided a sensing and locking device for controlling the operation of a mechanism in response to a force generated by an article movable by the mechanism, said device comprising a sensing member movable on contact with an article, means defining a wedge surface, and at least one rollable member arranged to co-operate with the wedge surface to lock a part of the mechanism as a result of a force applied to the sensing member being transmitted to the rollable member so that the rollable member is displaced to co-operate in generating an arresting force on the said part of the mechanism.

Still further according to the present invention there is provided a sensing and locking device for locking a web of self-adhesive labels at a predetermined position, said device comprising a dispense edge member for the labels of the web, a pivot flap located at a predetermined location down-stream of the edge member, said dispense edge member having relatively inclined opposed surfaces transversed by the web path, a ball lying between the surfaces, means biasing the ball away from the parts of the surfaces lying closer together, and a connection between the sensing member and the biasing means whereby on impact of an edge of a label being dispensed from the dispense edge the bias of the biasing means is overcome and the ball moves towards said parts of the surfaces and locks the web against continued movement.

DESCRIPTION OF THE PREFERRED EMBODIMENTS

Figure 1:
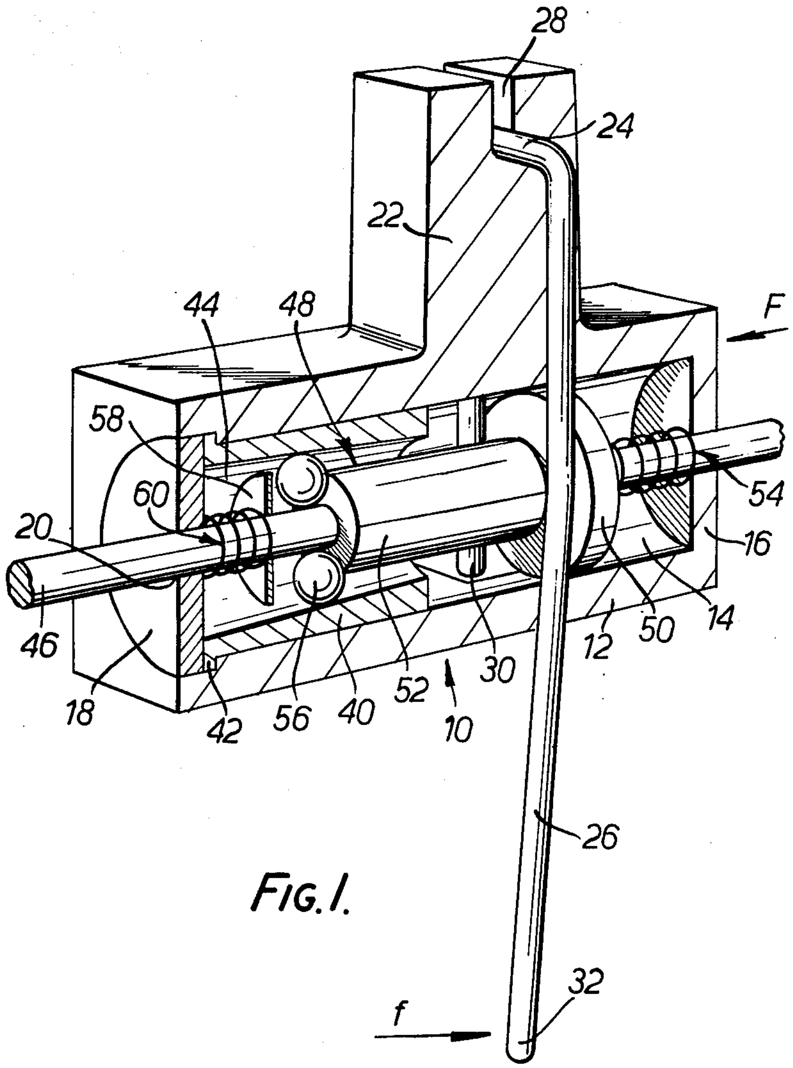
FIG. 1 is a perspective sectional view of a first sensing and locking device in accordance with the invention.

Referring now to the drawings and in particular to FIG. 1, the first sensing and locking device 10 in accordance with the invention comprises a housing 12 having a stepped internal bore or passage 14 which is closed at one end by an integral end portion 16 of the casing and is closed at the other end by a disc 18 with a central aperture 20. The casing has an integral upstanding bracket 22 (or other projection) which supports a portion 24 of a sensing lever 26 which portion 24 extends transversely to the internal bore or passage 14 and is freely pivotally mounted in a recess 28 of the upstanding bracket 22. One end portion 30 of the lever 26 extends through an appropriate aperture (not shown) into the bore or passage 14 of the casing and serves a purpose to be described hereinafter. The other end portion 32 of the lever 36 forms a sensing member.

The bore or passage 14 receives a bushing 40 with a flange 42 at one end which engages in the step of the stepped bore 14 and has an internal frusto-conical surface 44. The end disc 18 engages in an end portion of the bore of larger diameter and engages against the flange 42 of the bush 40.

A rod or other elongate member 46 passes coaxially through the bore or passage and carries for free movement a spring-loaded sleeve 48, one part 50 of which has an external diameter corresponding substantially to the internal diameter of the bore 14 and another part 52 of which extends into the bushing 40 and is of smaller diameter. The sleeve 48 is biased by a helical compression spring 54 acting between the closed end portion 16 of the housing 12 and the larger diameter part 50 of the sleeve. By this means a ring of balls 56 lying against the other end of the sleeve and lying within the frusto-conical surface 44 of the bushing enables the rod or other elongate member to move freely relatively to the housing since the balls are not in wedging relationship with the surface 44. The balls are retained against the end of the sleeve by a small disc 58 lightly loaded by a helical compression spring 60 also abutting against the detachable end disc 18 of the housing 12.

In use, so long as the housing is subjected to a force F acting in the direction indicated by the corresponding arrow, the housing 12 moves along the rod 46 freely since the balls 56 remain free to rotate between the wall of the frusto-conical internal surface 44 of the bushing, the retaining disc 58 and the free end surface of a portion 52 of the sleeve 48.

Immediately the lever encounters a small force f acting in the direction indicated by the corresponding arrow such as may be generated by the edge of a label just dispensed from a backing strip (see FIG. 2), the internal portion 30 of the lever acts against the part 50 of the sleeve thus allowing the balls 56 to enter a narrower portion of the frusto-conical surface 44 under the action of spring 60 and thus locking against the rod 46 and instantly preventing further movement. The amount of force required is very small and the force provided by the edge of a paper label is thus sufficient to resist the substantially larger force F which is provided by the action of a part of the actuating mechanism of a label applicator. It will be understood that the rod 46 may not pass through the device and when incorporated in an applicator may take other forms. Once a label has been dispensed the force f is removed and the device resumes its configuration such that the rod can move freely again.

Figure 2:
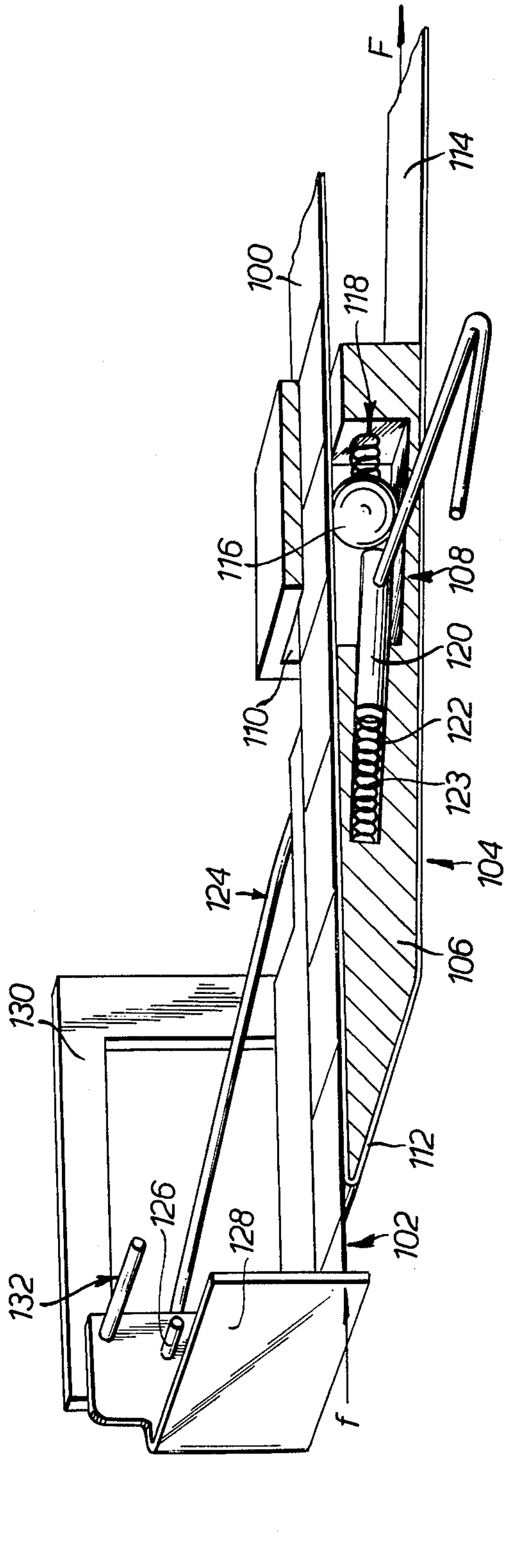
FIG. 2 is a perspective view, partly in section, of a second sensing and locking device in accordance with the invention.

Turning now to the second embodiment illustrated in FIG. 2, the sensing and locking device illustrated is shown with a plain label web 100 in position with one label 102 in the process of being detached ready for application to an article (not shown).

The device 104 includes a block 106 having a rectangular recess 108 which lies opposite a slot 110 through which the label web 100 passes before it reaches a dispense edge 112 at which labels are peeled from the backing strip of the web. The operation of the applicator as a whole (not shown) involves the application of a force F to the "spent" label strip 114 and the label web 100 is fed from a reel, not shown.

The rectangular recess 108 carries a single ball 116 loaded by a light spring 118 so that it normally engages against a correspondingly shaped end of a piston 120 movable in a bore 122 extending from the recess 108 towards the dispense edge 112 of the block. The bore 122 also houses a light spring 123 which biases the piston 120 so that normally the ball 116 is free to rotate and thus to allow the web 100 to pass freely through the slot 110. The bottom of the recess 108 is inclined so that the shallower end of the recess is adjacent to the piston 120.

The piston 120 is secured to a light rod 124 which is bent to form a portion 126 received in an aperture in a pivotal flap 128 which flap in its normal position lies in the path of a label 102 being dispensed from the web 100 at the dispense edge 14. The flap 128 is pivoted to a part 130 of the casing of the applicator (not otherwise shown) at a point 132 remote from the label web 100 and consequently under its own weight the flap is biased to the position as shown in FIG. 2.

In operation, when a label 102 has reached the position shown in FIG. 2 (that is projecting about 3 mm. beyond the dispense edge 112), the label 102 applies a small force f to the flap and the flap pivots so that in turn a force is applied to the light rod 124 secured to the piston 120 which causes the latter to retract slightly to its bore 122. The ball 116 is then free to move under the action of the spring 118 and the label web 100 on the surface of the block is locked by the ball. With force f removed, an unlocking force must be applied to return the piston, and consequently the ball 116 to the position in which the web 100 is free to move.

It will be apparent that in both of the hereinbefore described devices action of an applicator can be controlled by the action of a single thin piece of paper acting edgewise to stop a web of labels being pulled through an applicator with a force which is large in comparison with the force generated by the label. The lightness of the action required and the instantaneous reaction it provokes ensures high accuracy in locating a label at a required position.

All the components of the devices hereinbefore described may be of plastics material.

Broadly, the hereinbefore described embodiments make use of at least one rollable member which can cooperate with a wedging surface or surfaces to lock an elongate element passing between them as a result of a force being applied slightly to unbalance forces acting on the rollable member when free to rotate so that the rollable member is displaced to cooperate with the wedging surface or surfaces and thereby lock the elongate member.

I claim:

1. A sensing and locking device for controlling the operation of a mechanism in response to a force generated by an article movable by the mechanism, said device comprising a sensing member movable on contact with an article,
means defining a wedge surface, and
at least one rollable member arranged to co-operate with the wedge surface to lock a part of the mechanism as a result of a force applied to the sensing member being transmitted to the rollable member so that the rollable member is displaced to co-operate in generating an arresting force on the said part of the mechanism.

2. A sensing and locking device according to claim 1, wherein the means defining a wedge surface includes a tapered space confining said at least one rollable member in said space, and wherein the device further comprises means connected with said sensing member serving to permit free rotation of the rollable member until acted upon by said force, when the rollable member will move into a narrower portion of the tapered space and thereby directly lock said part of said mechanism.

3. A sensing and locking device according to claim 2, wherein the sensing member is an elongate pivotal member and means is provided to resiliently bias the elongate pivotal member to a position in which the rollable member is free to rotate.

4. A sensing and locking device according to claim 2 wherein the means defining the tapered space is a bushing with an internal frusto-conical space and the rollable member is a plurality of balls confined for limited movement within said tapered space between a locking and an unlocking position.

5. A sensing and locking device according to claim 1 wherein the part of the mechanism is an elongate member.

6. A sensing and locking device according to claim 1 wherein the wedge surfaces are defined by two plane surfaces and the rollable member is a ball mounted between those surfaces, said sensing member serving on contact with a said article to move the ball into a wedged position between the two surfaces thereby indirectly locking the mechanism by application of pressure to an elongate member being fed through the mechanism.

7. A sensing and locking device according to claim 6 wherein the sensing member is a pivotally mounted, balanced flap and the device further comprising a linkage for transmitting flap movement to the ball.

8. A sensing and locking device according to claim 6 wherein the said two surfaces are defined by parts of a label applicator arranged to guide a web of labels, individual labels serving to actuate the sensing member.

9. A sensing and locking device for locking a web of self-adhesive labels at a predetermined position, said device comprising a dispense edge member for the labels of the web, a pivot flap located at a predetermined location downstream of the edge member, said dispense edge member having relatively inclined opposed surfaces transversed by the web path, a ball lying between the surfaces, means biasing the ball away from the parts of the surfaces lying closer together and a connection between the sensing member and the biasing means whereby on impact of an edge of a label being dispensed from the dispense edge the bias of the biasing means is overcome and the ball moves towards said parts of the surfaces and locks the web against continued movement.

10. A label applicator incorporating a sensing and locking device according to claim 1, said applicator comprising:

means for dispensing individual labels from a web of labels including a backing strip and self-adhesive labels thereon, and means defining a dispense edge for peeling successive labels from the backing strip, the sensing member being operable by the edge of a said label dispensed at the dispense edge.

* * * * *